(12) United States Patent
Baker et al.

(10) Patent No.: US 8,817,896 B2
(45) Date of Patent: Aug. 26, 2014

(54) METHOD AND DEVICE FOR ALLOCATING RESOURCES IN AN OFDM NETWORK

(75) Inventors: Matthew P. J. Baker, Canterbury (GB); Timothy J. Moulsley, Caterham (GB)

(73) Assignee: Koninklijke Philips N.V., Eindhoven (NL)

( * ) Notice: Subject to any disclaimer, the term of this patent is extended or adjusted under 35 U.S.C. 154(b) by 436 days.

(21) Appl. No.: 12/597,525

(22) PCT Filed: Apr. 29, 2008

(86) PCT No.: PCT/IB2008/051658
§ 371 (c)(1),
(2), (4) Date: Oct. 26, 2009

(87) PCT Pub. No.: WO2008/135911
PCT Pub. Date: Nov. 13, 2008

(65) Prior Publication Data
US 2010/0118998 A1 May 13, 2010

(30) Foreign Application Priority Data
May 2, 2007 (EP) ..................... 07301014

(51) Int. Cl.
*H04K 1/10* (2006.01)

(52) U.S. Cl.
USPC ......................................... 375/260

(58) Field of Classification Search
CPC .......... H04B 7/00; H04B 1/707; H04B 15/00; H04J 3/1694; H04K 1/10; H04L 1/02; H04L 5/0055; H04L 27/28; H04W 24/02; H04W 72/00; H04W 72/04
USPC .......... 375/259, 260, 267, 141; 370/208, 347, 370/252, 329, 380; 455/63.1, 403, 509, 455/522; 714/749, 790
See application file for complete search history.

(56) References Cited

U.S. PATENT DOCUMENTS

| | | | | |
|---|---|---|---|---|
| 2004/0100939 | A1* | 5/2004 | Kriedte et al. | 370/347 |
| 2006/0104379 | A1* | 5/2006 | Li et al. | 375/267 |
| 2007/0183307 | A1* | 8/2007 | Akita et al. | 370/208 |
| 2007/0189404 | A1* | 8/2007 | Baum et al. | 375/260 |
| 2007/0195906 | A1* | 8/2007 | Kim et al. | 375/267 |
| 2007/0230600 | A1* | 10/2007 | Bertrand et al. | 375/260 |
| 2008/0260051 | A1* | 10/2008 | Boccardi et al. | 375/259 |

FOREIGN PATENT DOCUMENTS

| | | | |
|---|---|---|---|
| EP | 1528829 A2 | 5/2005 | |
| EP | 1699196 A1 | 9/2006 | |

OTHER PUBLICATIONS

Philips: "R1-060558-Frequency-Distributed Transmission in E-UTRA Downlink"; 3GPP TSG RAN WGI Meeting #44, [Online] Feb. 13, 2006, 5 page Document, Retrieved From the Internet on Sep. 2, 2008: http://isearch.etsi.org/3GPPSearch/isysquery/9f984d25-7c4e-4f95-963a-flaf2dbb11280/3/doc/sub/R1-060558.DOC>.
Philips: "R1-072393-Further Discussion of Resource Block Mapping for E-UTRA Downlink"; 3GPP TSG RAN WG1 Meeting #49, [Online] May 7-11, 2007, 4 page Document. Retrieved From the Internet on Sep. 2, 2008: http://isearch.etsi.org/3GPPSearch/isysquery/8acd36c12-7750-4539-9625-3fc91dcaca19/2/doc/sub/R1-072393. DOC>.

* cited by examiner

*Primary Examiner* — Sam K Ahn
*Assistant Examiner* — Shawkat M Ali

(57) ABSTRACT

A radio station comprises means for allocating resources for communication with at least one other station, and including means for mapping data to be transmitted from at least the radio station to the at least one other station, and means for applying a cyclic shift to the data mapping, wherein this cyclic shift is adjusted depending on the number of data blocks to be mapped. A possible implementation concerns the mapping of the DVRB (Distributed Virtual Resource Block) in OFDM.

14 Claims, 5 Drawing Sheets

Note: Each colour represents data from a different D-VRB (a) $N_{DVRB} = 2$  (b) $N_{DVRB} = 4$

PRIOR ART

Note: Each colour represents data for a different user

Note: Each colour represents data for a different user

US 8,817,896 B2

METHOD AND DEVICE FOR ALLOCATING RESOURCES IN AN OFDM NETWORK

FIELD OF THE INVENTION

This invention relates to a method for communicating between at least two radio stations, and to such radio stations. More specifically, this invention relates to a method in an OFDM network, like for instance a mobile system as a UMTS network.

BACKGROUND OF THE INVENTION

In OFDM data transmission systems such as the downlink of the UMTS LTE, data may be transmitted in either localised or distributed modes. In localised mode, data for one user is transmitted using a contiguous block of OFDM sub-carriers, while in distributed mode data is transmitted on a plurality of separated sub-carriers.

Typically, data for transmission is subdivided into data blocks known as Virtual Resource Blocks (VRB). The data is then mapped onto specific resource elements on the OFDM waveform, where one resource element comprises one OFDM symbol duration on one sub-carrier. The resource elements of the OFDM waveform are grouped into Physical Resource Blocks (PRBs) which may for example comprise 12 sub-carriers for a duration of 14 OFDM symbols.

The diagram of FIG. 1 defines the terminology: a VRB may typically contain the same amount of data as can be mapped to a PRB. VRBs containing data for mapping to the PRBs in a localised way are known as Localised VRBs (LVRBs), while VRBs containing data for mapping to the PRBs in a distributed way are known as Distributed VRBs (DVRBs).

Some known ways of mapping DVRBs to PRBs include:

Fully-scattered mapping illustrated on FIG. 2: This involves placing individual data symbols from the DVRBs into scattered (possibly pseudo-random) positions in the PRBs containing data from LVRBs. This has the disadvantage that the users receiving the localised transmissions need to know the locations of the individual distributed data symbols and remove these from their own data. On the other hand, a fully-scattered mapping maximises transmit diversity for the distributed data, and also helps to randomise inter-cell interference in a cellular communication system.

Grouped mapping is illustrated on FIG. 3. Here each PRB contains data either from a LVRB or from a DVRB but not both. This avoids the drawback of the localised data receivers needing to know the locations of distributed data symbols. However, the degree of diversity for the distributed transmissions is reduced, especially if the data from one DVRB is mapped onto specific subcarriers for the duration of a subframe as shown above.

As a consequence, there is a need for an improved method allowing a large frequency diversity of the mapping.

SUMMARY OF THE INVENTION

It is an object of the present invention to provide improved mapping of data to resource elements.

It is another object of the invention to provide a mapping of the resource enabling frequency diversity in all situations.

Still another object of the invention is to provide a method for mapping resources allowing a good frequency diversity without causing too much overhead in signalling.

According to a first aspect of the invention, it is proposed a method for allocating resources for communication between a primary station and at least one secondary station, comprising mapping data to be transmitted from at least one transmitting station, being one of the primary station and the at least one secondary station, to at least one receiving station being the other one of the primary station and the at least one secondary station, applying a cyclic shift to the data mapping, wherein this cyclic shift is adjusted depending on the number of data blocks to be mapped.

According to the invention, a cyclic shift is applied in the data mapping. The cyclic shift differs from OFDM symbol to OFDM symbol, wherein the size of the difference in shift is dependent on the number of data blocks to be mapped in a distributed manner to a group of resource elements.

According to the invention, a shift is applied in the data mapping from symbol to symbol, wherein the size of the shift is dependent on the number of data blocks to be mapped in a distributed manner to a group of resource elements.

The invention provides an improved method for mapping data in a distributed manner to the subcarriers of an OFDM transmission waveform. It is recognised that while applying different cyclic shifts to different OFDM symbols is useful in improving diversity and randomisation, its usefulness depends on the number of data blocks to be mapped. The invention therefore provides means of determining a suitable size for the difference in cyclic shift between OFDM symbols dependent on the number of data blocks to be mapped.

In accordance with another aspect of the invention, it is proposed a radio station comprising means for allocating resources for communication with at least one other station, comprising means for mapping data to be transmitted from at least the radio station to the at least one other station, and means for applying a cyclic shift to the data mapping, wherein this cyclic shift is adjusted depending on the number of data blocks to be mapped.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 10:
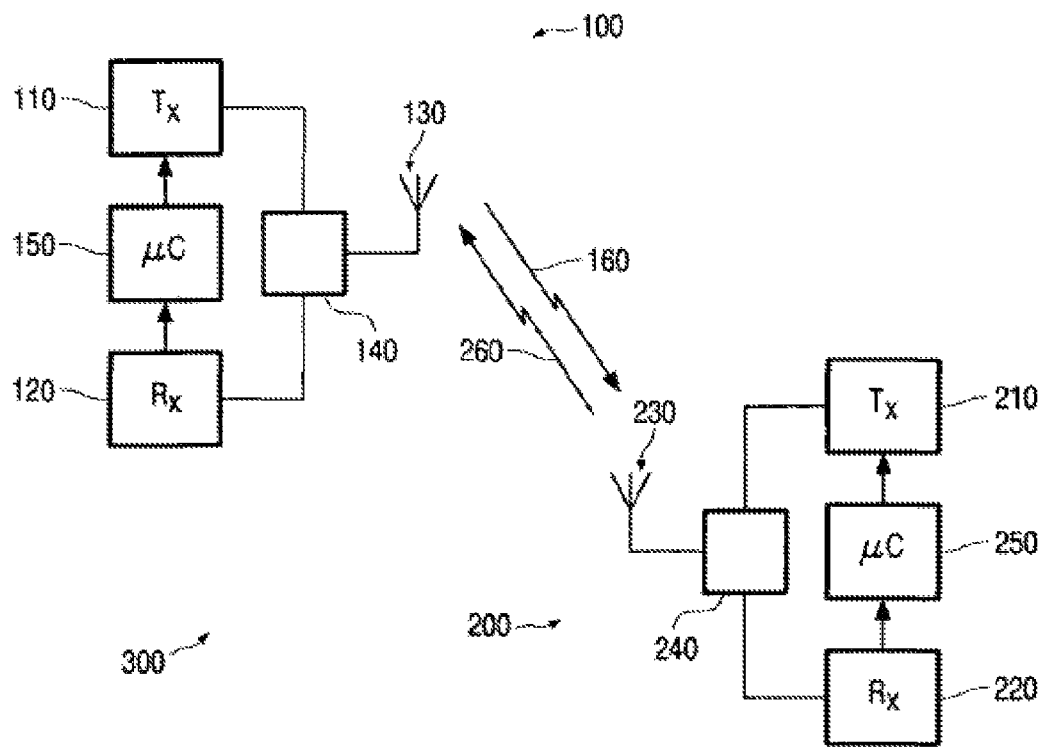
FIG. 10 is a block diagram illustrating a network comprising radio stations implementing the method of the invention.

The present invention relates to a system of communication 300 as depicted on FIG. 10, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 by a coupling means 140, which may be for example a circulator or a changeover switch.

Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a first channel 160 and transmission from the secondary radio station 200 to the first radio station 100 takes place on a second channel 260.

As explained before, when one of the stations 100 or 200 needs to transmit data to at least one other station, the data subdivided in VRBs needs to be mapped onto PRBs. Frequency diversity permits to reduce the impact of bad conditions localized on a particular frequency band. As seen above, a fully scattered scheme permits such a frequency diversity but causes a huge signaling need to signal to all the stations their allocated blocks.

Figure 1:
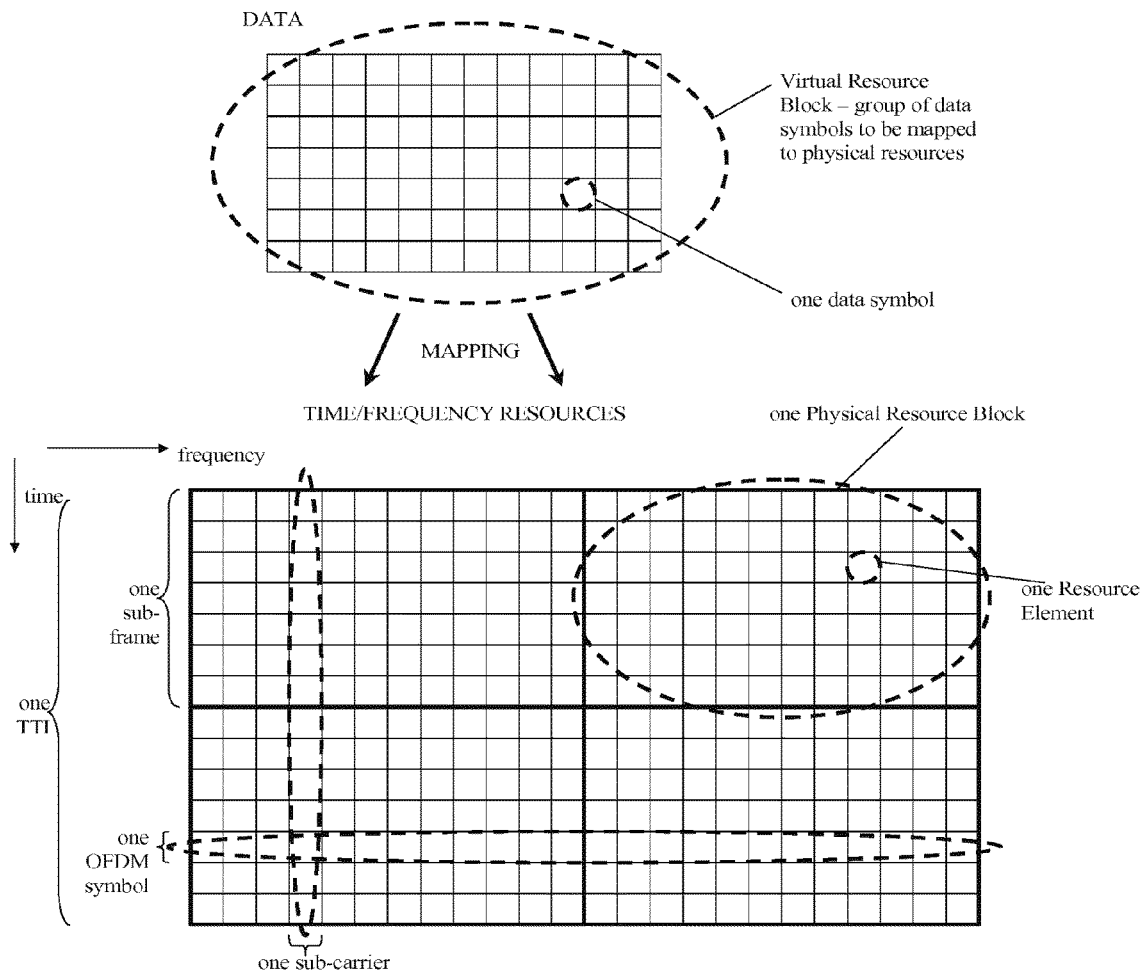
FIG. 1, already described, is a diagram illustrating a set of physical resources and the corresponding virtual resources.
Figure 2:
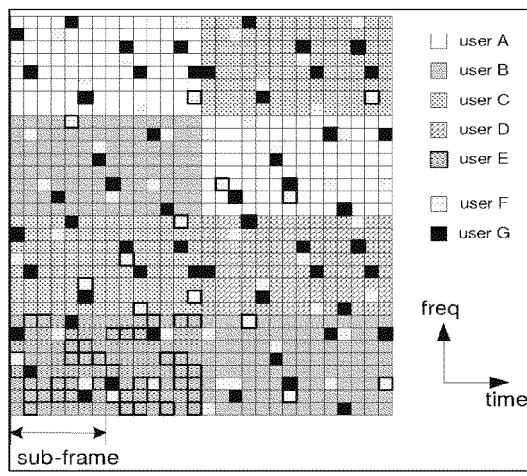
FIG. 2, already described is a diagram illustration a conventional mapping method, FIG. 3, already described is a diagram illustration a conventional mapping method, FIGS. 4A and 4B, already described is a diagram illustration a conventional mapping method.
Figure 3:
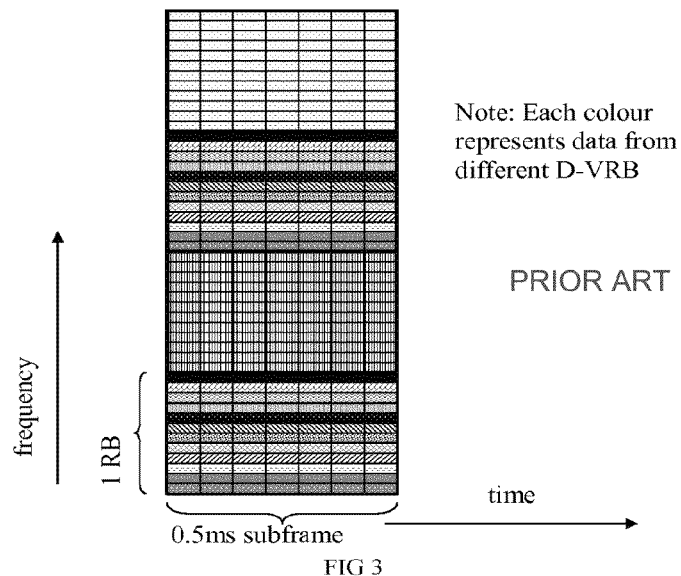
Figures 4A, 4B:
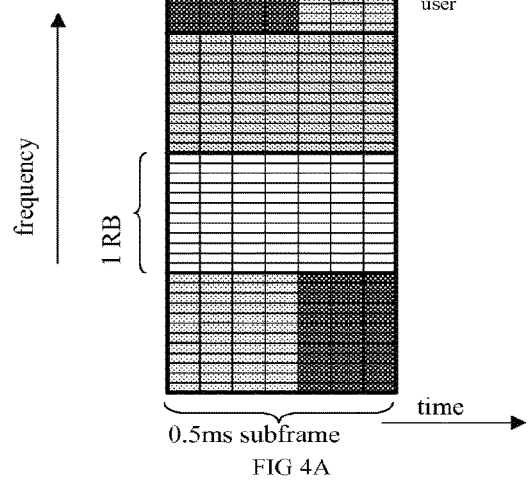

Additional diversity may be achieved by other techniques, such as TDMA mapping where each OFDM symbol (or a set of adjacent sub-carriers in an OFDM symbol) is allocated to data from a different DVRB as seen on FIG. 4A and FIG. 4B: However, this is not straightforward when each OFDM symbol in a PRB may have a different number of resource elements available for data mapping, for example due to the presence of pilot symbols or control signalling in some resource elements.

Figure 5:
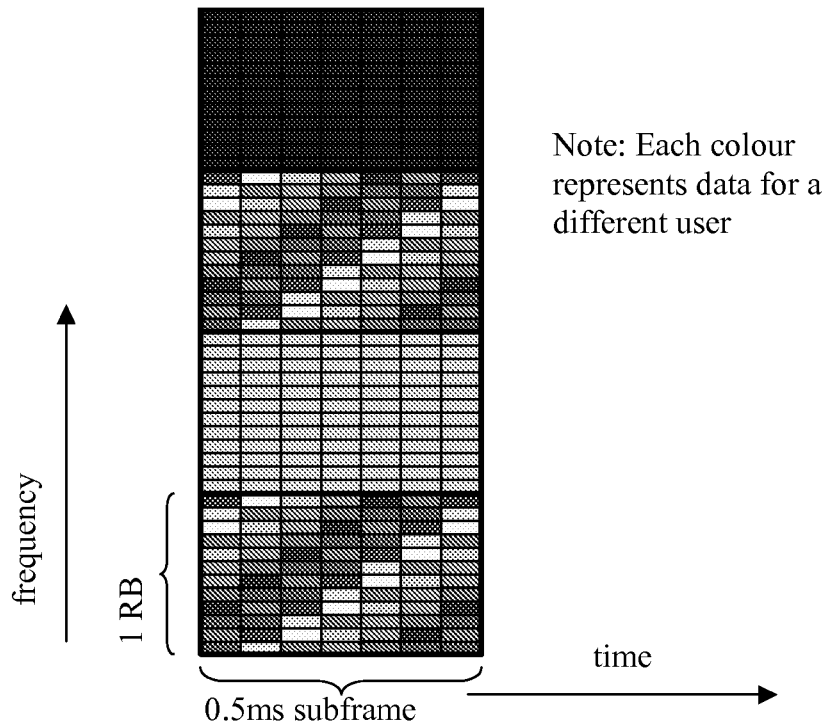
FIG. 5 is a diagram illustrating a mapping method using a cyclic shifting.

Alternatively, a cyclic shift may be applied to the data from each DVRB around the subcarriers within each PRB carrying data from a DVRB, (with the amount of cyclic shift increasing by one from one OFDM symbol to the next) as shown on FIG. 5.

The example shown works well in cases such as when the number of different DVRBs mapped to the PRBs containing distributed data is the same as the number of subcarriers within a PRB, such as the example shown in the above. With some numbers of DVRBs to be mapped to the PRBs designated for distributed data, the data from one DVRB may end up getting mapped to the same subset of subcarriers from the said PRBs for the duration of a subframe, while for other numbers of DVRBs a natural difference in cyclic shift between OFDM symbols may occur, which may be nullified by an additional imposed cyclic shift.

Figure 6:
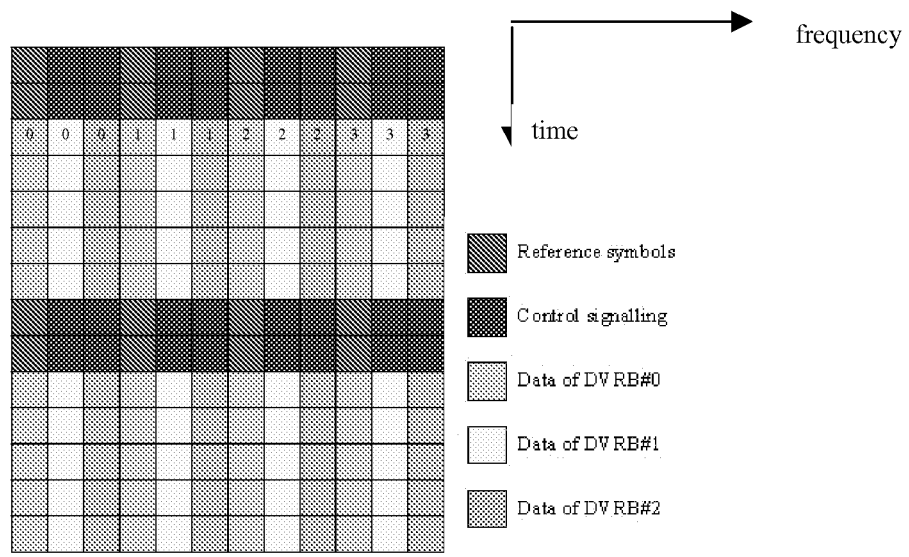
FIG. 6-9 are diagrams illustrating mapping methods for introducing the embodiment of the invention

This is shown in the following example depicted on FIG. 6, where data from one DVRB is represented by one colour, and the numbers represent the $n^{th}$ data bit from the respective DVRB.

In this example, data from three DVRBs is to be transmitted. This data could for example be mapped to three PRBs, one of which is shown above. The PRB contains 12 subcarriers. A regular mapping of the data symbols from each subcarrier in turn results in all the data from each DVRB being restricted to a certain subset of the available subcarriers. This may be disadvantageous as particular subcarriers may experience poor channel quality for the duration of the subframe, for example due to fading or interference.

Figure 7:
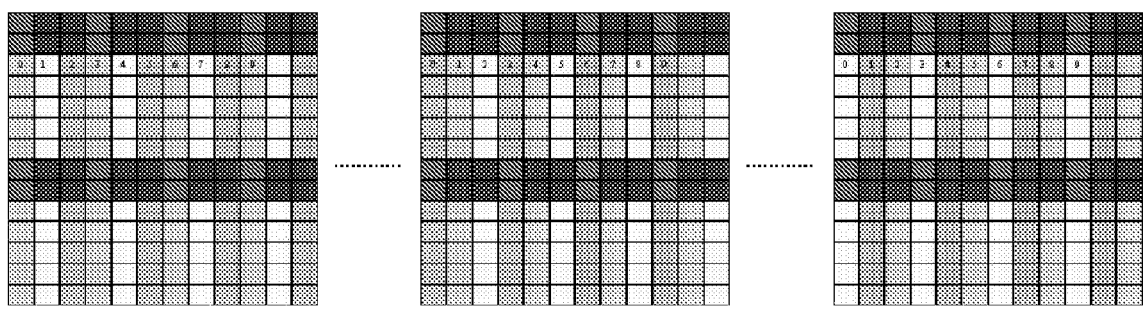

This is also the case if a different mapping of data symbols to subcarriers is used, such as shown on FIG. 7.

Here 3 PRBs are shown, separated in frequency. The data symbols are mapped across all the PRBs, but data from one DVRB is still restricted to a subset of the available subcarriers.

Figure 8:
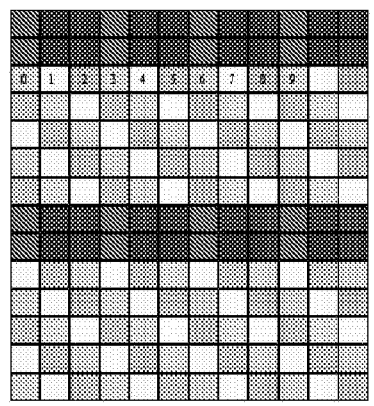

This problem may be solved by applying an additional cyclic shift from one symbol to the next, as shown on FIG. 8.

Figures 9A, 9B:
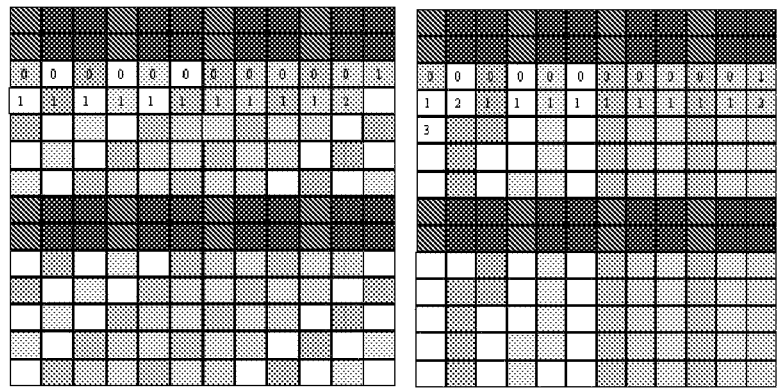

A different example, with 11 DVRBs, is shown on FIG. 9A.

Here no cyclic shift is applied, but the data symbols from each DVRB rotate naturally across the subcarriers.

However, if the same additional cylic shift is applied as when three DVRBs are mapped, the natural cyclic shift is cancelled and the same basic problem re-emerges as can be seen on FIG. 9B.

In the most general embodiment of the invention, the cyclic shift may change in a non-uniform way between OFDM symbols such that the shift is given by function (F) of the number of data blocks ($N_d$) and the OFDM symbol index (n). So according to the invention the shift applied to the nth OFDM symbol may be expressed as $S(n)=S0+F(n, N_d)$, where S0 is the shift applied to the first OFDM symbol (i.e. with symbol index n=0). S0 may conveniently be zero.

In a special case, the additional cyclic shift applied to successive OFDM symbols is a constant. In that case, the shift is of the form, $S(n)=S0+n \cdot Ns$, where Ns is the additional shift applied to successive OFDM symbols. According to the invention the value of Ns depends on $N_d$.

In one embodiment of the invention, the cyclic shifting depends on whether the number of DVRBs, $N_d$, to be mapped is a factor of the number of subcarriers, $N_{sc}$. For example, if $N_{sc}$ mod $N_d=0$, then an additional cyclic shift of one subcarrier is applied from one OFDM symbol to the next (i.e. Ns=1), while if $N_{sc}$ mod $N_d \neq 0$ a cyclic shift is not applied (i.e. Ns=0).

In some embodiments, transmit diversity may be used. In this case, it may be advantageous to group data symbols in groups mapped to contiguous resource elements, where the number of such contiguous resource elements in one group is equal to the number of transmit antennas, $N_t$. The resource elements in one group would be used for data from the same DVRB. In such a case, a suitable condition for determining whether a cyclic shift of one subcarrier is to be applied could be if $(N_{sc}/N_t)$ mod $N_d=0$.

In another embodiment, the size of the additional cyclic shift may be designed to be different in different cells, especially adjacent cells from which the transmissions may interfere with one another. For example, if a cyclic shift is applied, the magnitude of the difference in shift between OFDM symbols may be a function of the Cell ID, such as Ns=Cell_ID mod $N_d$.

Note that the invention can also be applied with shifts in other domains than frequency—for example, a shift in time, code or antenna could also be used.

This invention could also be applied to the fully scattered mapping.

This invention may be applied to communication systems utilising multiple resource elements, such as UMTS LTE.

It is an object of the present invention to provide improved mapping of data to resource elements.

According to the invention, a shift is applied in the data mapping from symbol to symbol, wherein the size of the shift is dependent on the number of data blocks to be mapped in a distributed manner to a group of resource elements.

The invention provides an improved method for mapping data in a distributed manner to the subcarriers of an OFDM transmission waveform. It is recognised that while applying different cyclic shifts to different OFDM symbols is useful in improving diversity and randomisation, its usefulness depends on the number of data blocks to be mapped. The invention therefore provides means of determining a suitable size for the difference in cyclic shift between OFDM symbols dependent on the number of data blocks to be mapped.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method for allocating resources for Orthogonal Frequency-Divisional Multiplexing (OFDM) communication between a primary station and at least one secondary station, comprising:
   mapping data to be transmitted from at least one transmitting station, being one of the primary station and the at least one secondary station, to at least one receiving station being one of the at least one secondary station and the said primary station,
   determining a cyclic shift based on a number of distributed virtual resource blocks $N_d$, to be mapped wherein when $N_d$ is a factor of a number of subcarriers $N_{sc}$ NSC Mod Nd=0, the cyclic shift applied to an nth OFDM symbol is expressed as $S(n)=S0 +F(n, N_d)$, where S0 is a shift applied to a first OFDM symbol (symbol index n=0); and
   applying said cyclic shift to the mapped data.

2. The method of claim 1 wherein a size of a difference in shift is dependent on the number of data blocks to be mapped in a distributed manner to a group of resource elements.

3. The method of claim 1, further comprising the step of grouping data symbols in groups mapped to contiguous resource elements, where the number of such contiguous resource elements in one group is equal to a number of transmit antennas, $N_t$.

4. The method of claim 1, wherein the cyclic shift is a function of an identity of a cell of a primary station.

5. The method of claim 1, wherein the cyclic shift comprises at least one of: a shift in time, a shift in code, a shift in frequency and a shift in antenna.

6. A radio station comprising means for allocating resources for Orthogonal Frequency-Divisional Multiplexing (OFDM) communication with at least one other station, said radio station comprising:
   means for mapping data to be transmitted from at least the radio station to the at least one other station,
   means for determining a cyclic shift based on a number of distributed virtual resource blocks, $N_d$, wherein when $N_d$ to be mapped is a factor of a number of subcarriers $N_{sc}$ NSC Mod Nd=0, the cyclic shift applied to an nth OFDM symbol is expressed as $S(n)=S0 +F(n, N_d)$, where S0 is a shift a lied to a first OFDM symbol (symbol index n=0); and
   means for applying a cyclic shift to the mapped data.

7. The radio station of claim 6, wherein a size of a difference in shift is dependent on the number of data blocks to be mapped in a distributed manner to a group of resource elements.

8. The radio station of claim 6, further comprising:
   grouping data symbols in groups mapped to contiguous resource elements, where the number of such contiguous resource elements in one group is equal to a number of transmit antennas, $N_t$.

9. The radio station of claim 6, wherein the cyclic shift is a function of an identity of a cell of the primary station.

10. The radio station of claim 6, wherein the cyclic shift comprises at least one of: a shift in time, a shift in code, a shift in frequency and a shift in antenna.

11. A method for allocating resources for Orthogonal Frequency-Divisional Multiplexing (OFDM) communication between a transmitting station and a receiving station, comprising:
   mapping data to be transmitted from the transmitting station to the receiving station,
   determining a cyclic shift based on a number of distributed virtual resource blocks, $N_d$, to be mapped wherein when $N_d$ is a factor of a number of subcarriers $N_{sc}$NSC Mod Nd=0, the cyclic shift applied to an nth OFDM symbol is expressed as $S(n)=S0 +F(n, N_d)$, where S0 is a shift a lied to a first OFDM (symbol index n=0); and
   applying said cyclic shift to the mapped data.

12. The method of claim 11, wherein the cyclic shift is a function of an identity of a cell of the transmitting station.

13. The method of claim 11, wherein the cyclic shift comprises at least one of: a shift in time, a shift in code, a shift in frequency and a shift in antenna.

14. The method of claim 11, further comprising:
   grouping data symbols in groups mapped to contiguous resource elements, where the number of such contiguous resource elements in one group is equal to a number of transmit antennas, $N_t$.

* * * * *